United States Patent [19]

Hong

[11] Patent Number: 5,315,423
[45] Date of Patent: May 24, 1994

[54] WAVELENGTH MULTIPLEXED TWO DIMENSIONAL IMAGE TRANSMISSION THROUGH SINGLE MODE OPTICAL FIBER

[75] Inventor: John H. Hong, Moorpark, Calif.

[73] Assignee: Rockwell International Corporation, Seal Beach, Calif.

[21] Appl. No.: 837,019

[22] Filed: Feb. 18, 1992

[51] Int. Cl.$^5$ .................... H04J 14/00; H04J 14/02
[52] U.S. Cl. ................... 359/124; 359/130; 359/117; 385/27; 385/132
[58] Field of Search ........... 359/115, 124, 125, 129, 359/130, 131, 117, 127, 154; 385/317, 132

[56] References Cited

U.S. PATENT DOCUMENTS

| | | | |
|---|---|---|---|
| 3,755,676 | 8/1973 | Kinsel | 359/117 |
| 3,845,294 | 10/1974 | Indig et al. | 359/129 |
| 3,924,931 | 12/1975 | Cheo | 385/37 |
| 4,557,563 | 12/1985 | Sprague | 350/162.12 |
| 4,857,726 | 8/1989 | Kinney et al. | 359/130 |
| 5,121,231 | 6/1992 | Jenkins et al. | 35/127 |
| 5,129,058 | 7/1992 | Mifune et al. | 395/162 |

OTHER PUBLICATIONS

Hiroichi Yoshida, Optical Communication Type Digital Data Transmission, Feb. 9, 1989.

Primary Examiner—Richard E. Chilcot, Jr.
Assistant Examiner—Rafael Bacares
Attorney, Agent, or Firm—John C. McFarren

[57] ABSTRACT

An apparatus and method are provided for transmitting two-dimensional images through a single mode optical fiber. Light from a broadband source is dispersed into component wavelengths, spatially modulated to contain an image, collected for multiplexing in a single mode optical transmission fiber, transmitted through the single mode fiber, and demultiplexed into its component wavelengths to reproduce the transmitted image. The two-dimensional dispersing and collecting elements may be realized using thin film channel waveguides having arrays of optical gratings. Because the dispersive element at the receiving (output) end of the transmission fiber must reproduce the dispersal pattern used at the source, the information transmitting device may be used for data encryption and decryption.

5 Claims, 2 Drawing Sheets

WAVELENGTH MULTIPLEXED TWO DIMENSIONAL IMAGE TRANSMISSION THROUGH SINGLE MODE OPTICAL FIBER

TECHNICAL FIELD

The present invention relates to the transmission of information through optical fibers and, in particular, to the parallel transmission of two-dimensional images through a single mode optical fiber.

BACKGROUND OF THE INVENTION

Optical fibers have greatly enhanced the capabilities of modern telecommunication systems by vastly increasing communication bandwidths, reducing costs, and improving reliability. Because of the limits of fiber technology and state-of-the-art input/output devices, however, current photonic communication links operate at bandwidths far below those that are theoretically possible.

Wavelength division multiplexing devices, such as the prior art apparatus illustrated schematically in FIG. 1, have been investigated for transmission of images through single mode fibers. Wavelength division multiplexing device 10 couples a plurality of input fibers to a single mode optical transmission fiber 11. The input fibers provide input light from a collection of modulated optical sources, such as semiconductor laser diodes, each emitting at a unique wavelength, such as $\lambda_1$, $\lambda_2$, $\lambda_3$, $\lambda_4$, and $\lambda_5$, for example. The input light is coupled to single mode transmission fiber 11 by means of a collective array of grating couplers 12, 14, 16, and 18. At the receiving end of transmission fiber 11, a dispersive array of grating couplers 13, 15, 17, and 19 separate the light into its wavelength components $\lambda_1$, $\lambda_2$, $\lambda_3$, $\lambda_4$, and $\lambda_5$, which are output on separate optical fibers as illustrated.

Although the bandwidth capabilities of single mode optical transmission fibers can be realized by the foregoing technique, wavelength division multiplexing device 10 does not fully address the possible relationships among the information being transmitted over the parallel wavelength channels, which is an important aspect of parallel communication channels. Therefore, an improved single mode optical fiber image transmission system is needed to operate at high bandwidths with low attenuation while exploiting the parallel nature of the information being transmitted.

SUMMARY OF THE INVENTION

The present invention comprises an apparatus and method of transmitting two-dimensional images through a single mode optical fiber. Light from a broadband source is dispersed into predetermined component wavelengths (or wavelength bands). The dispersed light is spatially modulated to contain an image, collected and multiplexed for transmission in a single mode optical fiber, transmitted through the single mode fiber, and demultiplexed into its component wavelengths to reproduce the transmitted image. The two-dimensional dispersing and collecting elements may be realized using multiplexed volume holograms generated in photorefractive media or thin film channel waveguides having arrays of optical gratings. Because the dispersive element at the receiving (output) end of the transmission fiber must be similar to that used at the source, the data transmitting device may include data encryption and decryption as an additional function.

A principal object of the invention is the parallel transmission of two-dimensional data through a single mode optical fiber. A feature of the invention is the use of thin film channel waveguides for dispersing and collecting the component wavelengths of a broadband light source. An advantage of the invention is the optical transmission of a large number of parallel channels of data at high bandwidths with low attenuation.

BRIEF DESCRIPTION OF THE DRAWINGS

For a more complete understanding of the present invention and for further advantages thereof, the following Detailed Description of the preferred Embodiment, makes reference to the accompanying Drawings, wherein like reference numerals refer to the same or similar components throughout the several figures in which.

DETAILED DESCRIPTION OF THE PREFERRED EMBODIMENTS

Figure 1:
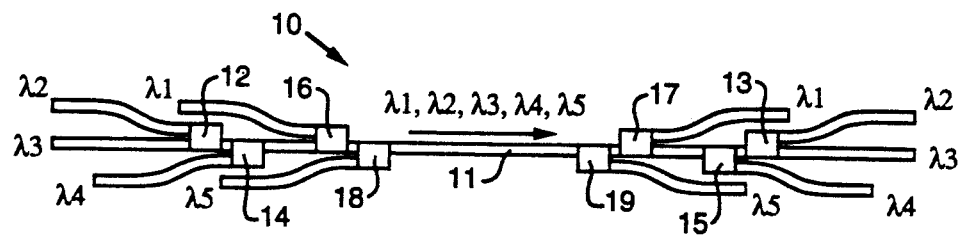
FIG. 1 is a schematic diagram of a prior art optical fiber array of spectral filters arranged to collect and disperse light according to its component wavelengths.
Figure 2:
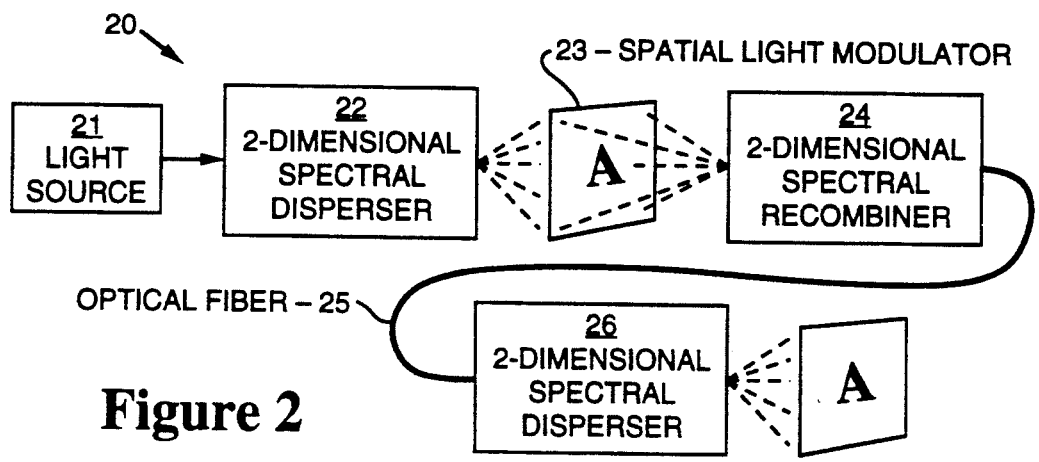
FIG. 2 is a schematic diagram illustrating the basic method of transmitting an image through a single mode optical fiber.

Referring to FIG. 2, a schematic diagram of a single mode optical fiber image transmission system 20 is illustrated. In system 20, broadband light source 21 provides an appropriate mix of broadband light, either coherent or incoherent, into a spectrally dispersive device 22. Unlike one-dimensional devices such as gratings and prisms found in monochromators, dispersive device 22 is an apparatus for separating the broadband light from source 21 into its spectral components across a two-dimensional area. Dispersive device 22 may comprise a multiplexed volume hologram written in a photorefractive medium, as is known in the prior art, or a thin film channel waveguide as described below. In either embodiment, the function of device 22 is to display the spectral components of the broadband light across a two-dimensional plane, as illustrated in FIG. 2, so that, for example, the shortest wavelength appears at the upper left corner and the longest wavelength appears at the lower right corner.

A spatial light modulator 23, or an image containing film, for example, is placed in the plane where the spectral components of the light have been separated. Spatial light modulator 23 (or the image film) locally modulates the light intensity to define the two-dimensional information or image to be transmitted. A second two-dimensional spectrally dispersive device 24, which may comprise a photographic medium having a multiplexed volume hologram or a thin film channel waveguide similar to device 22 but used in a reversed mode, is situated to collect and recombine the modulated spectral components of the light from spatial light modulator 23. Device 24 recombines the image-containing light into a single broadband beam that is coupled to and transmitted through a single mode optical fiber 25.

A third two-dimensional spectrally dispersive device 26 is placed at the receiving, or output, end of optical fiber 25. Dispersive device 26 must be similar to device 22 so that the light received by device 26 is dispersed into its spectral components in the same scheme provided by device 22. The spectrally dispersed light from device 26 thus reproduces the image generated by spatial light modulator 23.

Figure 3:
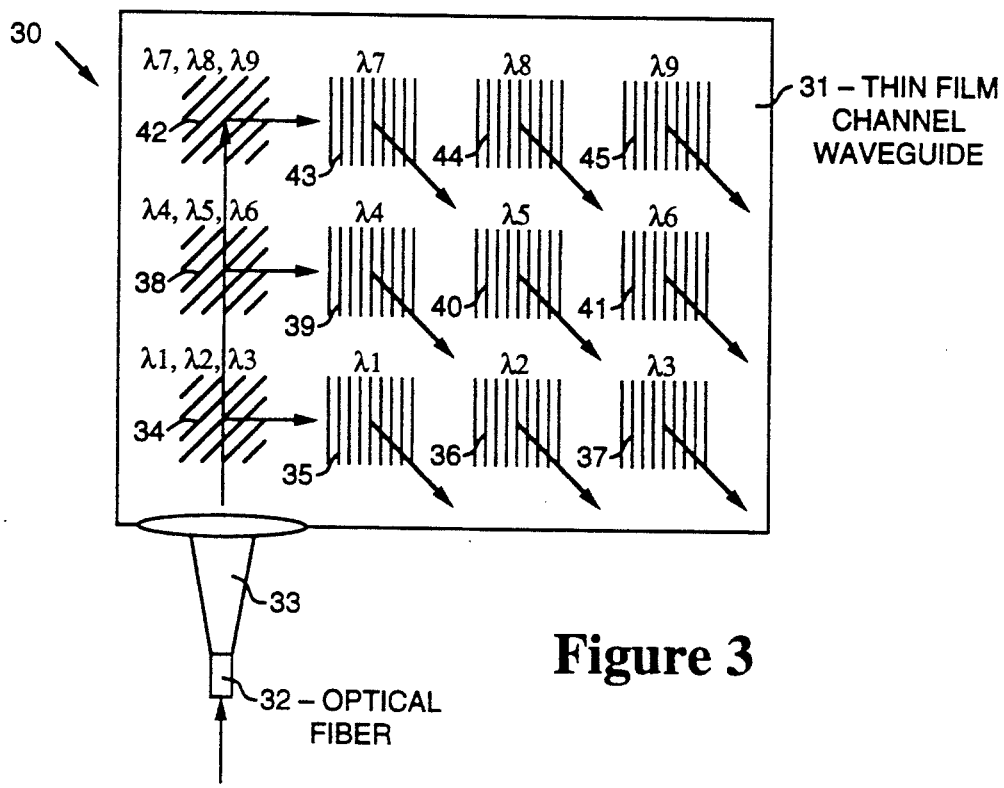
FIG. 3 is a plan view of a thin film channel waveguide of the present invention for dispersing and collecting component wavelengths of light to be transmitted through a single mode optical fiber.

Referring to FIG. 3, an integrated two-dimensional optical dispersive device 30 of the present invention is illustrated schematically. Device 30, which corresponds to dispersive device 22 illustrated in FIG. 2, comprises a thin film channel waveguide 31. Broadband light is provided to waveguide 31 through an optical fiber 32 that is connected to waveguide 31 by an optical coupler 33. For purposes of illustration, but not limitation, waveguide 31 is shown as comprising a simple 3×3 matrix, and the broadband light is shown as comprising wavelengths $\lambda_1$ through $\lambda_9$, each of which may comprise a specific wavelength or narrow band of wavelengths.

As shown FIG. 3, waveguide 31 comprises a matrix having a plurality of cells arranged in a plurality of rows and columns. Typically, waveguide 31 comprises a much larger array of cells than the 3×3 matrix illustrated. Each cell comprises an optical grating designed to diffract a predetermined wavelength or wavelength band of light. Broadband light entering waveguide 31 through coupler 33 is directed to pass through a first column of gratings, such as cells 34, 38, and 42. Cell 34 comprises a grating designed to diffract wavelengths $\lambda_1$, $\lambda_2$, and $\lambda_3$ along a first row of cells 35–37 within thin film waveguide 31 while passing wavelengths $\lambda_4$, $\lambda_5$, $\lambda_6$, $\lambda_7$, $\lambda_8$, and $\lambda_9$ along the first column. Cell 38 comprises a grating designed to diffract wavelengths $\lambda_4$, $\lambda_5$, and $\lambda_6$ along a second row of cells 39–41 while passing wavelengths $\lambda_7$, $\lambda_8$, and $\lambda_9$ along the first column. Cell 42 comprises a grating designed to diffract wavelengths $\lambda_7$, $\lambda_8$, and $\lambda_9$ along a third row of cells 43–45.

In each row of cells in waveguide 31 the gratings are designed to diffract light of a specific wavelength (or wavelength band) out of the plane of thin film waveguide 31 in a direction roughly normal to the surface of waveguide 31. In the first row of cells, grating 35 diffracts light of wavelength $\lambda_1$ upward from waveguide 31, as indicated by the arrow, while passing light at wavelengths $\lambda_2$ and $\lambda_3$ along the first row. Similarly, light at wavelength $\lambda_2$ is diffracted upward by grating 36 and light at wavelength $\lambda_3$ is diffracted upward by grating 37. The second and third rows function in a like manner to separate and disperse light of wavelengths $\lambda_4$ through $\lambda_9$ upward out of the plane of waveguide 31. Thus, thin film waveguide 31 separates the broadband input light into a matrix of wavelengths (or wavelength bands) that are projected outward from waveguide 31, approximately normal to the plane of waveguide 31.

Figure 4:
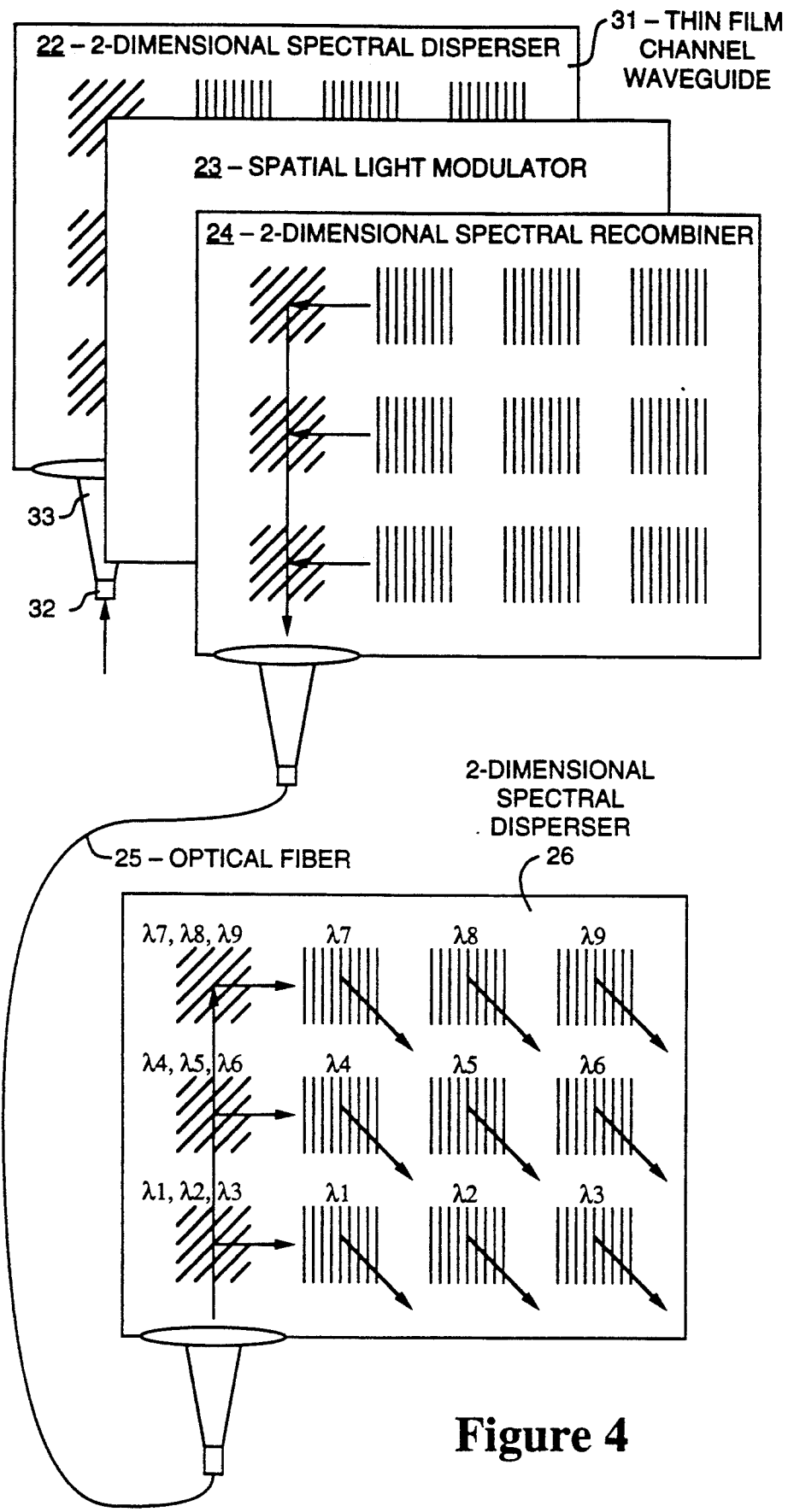
FIG. 4 is an expanded schematic diagram of a multi-layered embodiment of the system of FIG. 2 incorporating thin film waveguides as illustrated in FIG. 3.

In the method of the present invention, as further illustrated in FIG. 4, the spectrally dispersed light projected from waveguide 31 is modulated in intensity by an image producing spatial light modulator, such as modulator 23. The intensity modulated light is captured by a second thin film channel waveguide, corresponding to device 24 illustrated in FIG. 2, that reverses the dispersal process of waveguide 31 to recombine wavelengths $\lambda_1$ through $\lambda_9$ into broadband light that is transmitted through single mode fiber 25. An advantage of this embodiment of the present invention is that spatial light modulator 23 can be sandwiched between dispersing thin film waveguide 31 and thin film waveguide 24 that recombines the light after intensity modulation. Thus, dispersing device 22, spatial light modulator 23, and recombining device 24 can be mated during fabrication to form a unitary device.

The image carrying light transmitted by fiber 25 must be received by a light dispersing device 26 that reproduces the dispersal pattern of device 22 (e.g., waveguide 31) so that the image provided by spatial light modulator 23 is faithfully reproduced. Because of this requirement, the present invention may be utilized as an information encryption/decryption device. For example, the wavelength dispersal pattern produced by the grating cells in the matrix of waveguide 31 can be in any randomly predetermined arrangement. However, once the dispersal pattern of waveguide 31 is fixed, receiving device 26 must match the dispersal pattern of waveguide 31 to reproduce the image provided by modulator 23. Any other dispersal pattern produced by device 26 would result in a scrambled image output.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A system for parallel transmission of a two-dimensional image through a single mode optical fiber, comprising:
   a broadband light source;
   a first thin film channel waveguide for dispersing said broadband light into a two-dimensional array of spectral components;
   a two-dimensional spatial light modulator for modulating the intensity of said spectral components of said two-dimensional array to correspond to the two-dimensional image;
   a second thin film channel waveguide for collecting and recombining said modulated spectral components into a broadband light beam;
   a single mode optical fiber connected to said recombining means for transmitting said broadband light beam; and
   a third thin film channel waveguide connected to said single mode fiber for receiving and dispersing said transmitted broadband light beam into said intensity modulated two-dimensional array of spectral components to reproduce the two-dimensional image.

2. The system of claim 1, wherein each of said thin film channel waveguides includes a plurality of optical gratings arranged to form a two-dimensional matrix, each of said gratings selectively diffracting at least one of said spectral components.

3. A system for parallel transmission of a two-dimensional image through a single mode optical fiber, comprising:
   a source of broadband light;
   a first thin film channel waveguide having a first two-dimensional matrix of optical gratings for dispersing said broadband light to project a two-dimensional array of component wavelengths of said broadband light on a plane;

a spatial light modulator positioned on said plane for modulating the intensity of said component wavelengths to define the two-dimensional image;

a second thin film channel waveguide having a second two-dimensional matrix of optical gratings for collecting and recombining said modulated component wavelengths into a broadband light beam;

a single mode optical fiber connected to said said second thin film channel waveguide for transmitting said broadband light beam; and a third thin film channel waveguide connected to said single mode fiber and having a third two-dimensional matrix of optical gratings corresponding to said first matrix of optical gratings for receiving and dispersing said transmitted broadband light beam to reproduce the two-dimensional image.

4. The system of claim 3, wherein each of said optical gratings diffracts at least a predetermined one of said component wavelengths.

5. The system of claim 4, wherein said first two-dimensional matrix of optical gratings comprises a predetermined arrangement of said optical gratings for encrypting the two-dimensional image during transmission through said single mode fiber.

* * * * *